(12) United States Patent
Kao et al.

(10) Patent No.: US 11,326,714 B2
(45) Date of Patent: May 10, 2022

(54) MULTI-DIRECTIONAL TOUCH VALVE

(71) Applicant: Neoperl AG, Reinach (CH)

(72) Inventors: Chih-Hung Kao, New Taipei (TW);
Chin-Yuan Hsiao, New Taipei (TW)

(73) Assignee: NEOPERLAG, Reinach (CH)

(*) Notice: Subject to any disclaimer, the term of this patent is extended or adjusted under 35 U.S.C. 154(b) by 0 days.

(21) Appl. No.: 16/744,408

(22) Filed: Jan. 16, 2020

(65) Prior Publication Data

US 2020/0263806 A1 Aug. 20, 2020

(30) Foreign Application Priority Data

Feb. 15, 2019 (TW) .................................. 108105096

(51) Int. Cl.
*F15B 13/00* (2006.01)
*F16K 31/56* (2006.01)
*E03C 1/08* (2006.01)

(52) U.S. Cl.
CPC ................ *F16K 31/56* (2013.01); *E03C 1/08* (2013.01); *Y10T 137/9464* (2015.04)

(58) Field of Classification Search
CPC .................................... E03C 1/08; F16K 31/58
USPC ........................................................ 251/339
See application file for complete search history.

(56) References Cited

U.S. PATENT DOCUMENTS

| | | | | |
|---|---|---|---|---|
| 665,631 A * | 1/1901 | Duffus | ................... | B67D 1/124 251/156 |
| 4,456,222 A * | 6/1984 | Shen | ................. | F16K 31/524 137/801 |
| 4,512,551 A * | 4/1985 | Dalferth | .................... | E03C 1/08 251/251 |
| 4,940,206 A * | 7/1990 | Chung-Shan | ......... | E03C 1/0404 137/603 |
| 4,981,160 A * | 1/1991 | Sen-Tein | ................. | F16K 21/10 137/550 |
| 5,651,531 A * | 7/1997 | Lu | ......................... | F16L 55/055 137/801 |
| 5,704,397 A * | 1/1998 | Lu | ............................. | E03C 1/08 137/630.15 |
| 7,090,195 B1 * | 8/2006 | Huang | ................. | E03C 1/0404 251/274 |

(Continued)

FOREIGN PATENT DOCUMENTS

| | | |
|---|---|---|
| TW | I647397 B | 1/2019 |
| TW | I679366 | 12/2019 |

*Primary Examiner* — Robert K Arundale
(74) *Attorney, Agent, or Firm* — Karin L. Williams; Alan D. Kamrath; Mayer & Williams PC

(57) ABSTRACT

A multi-directional touch valve has a valve unit and a press unit. The valve unit has a housing, a main flow channel, and a switching unit. The housing has a shoulder portion being adjacent to an outlet end of the housing. The switching unit is mounted in the housing and selectively blocks the main flow channel. The press unit is connected with the valve unit and has a passing portion, a hanging portion, and an abutting portion. The hanging portion is movably held on the shoulder portion and has an inner edge spaced from an outer surface of the housing and a space formed in a side of the at least one hanging portion facing the passing portion. The press unit can be pressed from any of axial direction, transversal directions, and oblique directions to switch the switching unit.

15 Claims, 10 Drawing Sheets

(56) References Cited

U.S. PATENT DOCUMENTS

| | | | |
|---|---|---|---|
| 7,950,624 B2* | 5/2011 | Liao | E03C 1/08 |
| | | | 251/251 |
| 7,975,980 B2* | 7/2011 | Gao | F16K 21/10 |
| | | | 251/48 |
| 8,757,518 B2 | 6/2014 | Kao et al. | |
| 9,222,599 B2 | 12/2015 | Kao et al. | |
| 2004/0011978 A1* | 1/2004 | Shen | F16K 21/12 |
| | | | 251/51 |
| 2005/0145819 A1* | 7/2005 | Kao | F16K 31/52408 |
| | | | 251/339 |
| 2006/0145117 A1* | 7/2006 | Kao | E03C 1/08 |
| | | | 251/339 |
| 2006/0192161 A1* | 8/2006 | Kuna | E03C 1/0404 |
| | | | 251/95 |
| 2009/0045370 A1* | 2/2009 | Kao | F16K 31/52433 |
| | | | 251/324 |
| 2012/0018661 A1* | 1/2012 | Kao | E03C 1/0412 |
| | | | 251/359 |
| 2014/0217314 A1* | 8/2014 | Kao | F16K 47/023 |
| | | | 251/12 |

* cited by examiner

MULTI-DIRECTIONAL TOUCH VALVE

BACKGROUND OF THE INVENTION

1. Field of the Invention

The present invention relates to a water supply switching valve, and more particularly to a water supply switching valve mounted in an outlet of a tap.

2. Description of Related Art

A conventional kitchen sink faucet or bathroom sink faucet has a water outlet and a control handle disposed at different positions. The water outlet is disposed above the sink, and the control handle is disposed near the edge of the sink. After hands are washed, the control handle is turned off by the wet hand to stop the water flowing out, and the countertop near the sink may be wetted by water dropping from the wet hand.

A conventional tip touch valve mounted in a tip of a faucet can stop water flowing out at the outlet of the faucet. Users may not use their wet hands to turn off the control handle to stop water. The countertop is kept from getting wet. However, the conventional tip touch valve mounted in the tip of the faucet may only be switched from one direction. The tip touch valve can only be pressed up from the bottom of the valve to switch the valve, or can only be pressed from a side of the valve to switch the valve. The press direction of the valve is limited. To overcome the shortcomings, the present invention tends to provide a multi-directional touch valve to mitigate or obviate the aforementioned problems.

SUMMARY OF THE INVENTION

The main objective of the invention is to provide a multi-directional touch valve, which may stop water by pressing from multi directions.

A multi-directional touch valve comprises a valve unit and a press unit. The valve unit has a housing having an outlet end and a connecting end opposite each other, a main flow channel formed in the housing from connecting end to the outlet end, and a switching unit mounted in the housing and selectively blocking the main flow channel. The housing has a shoulder portion being adjacent to the outlet end of the housing and protruding transversally outward from the housing. The press unit is movably connected with the valve unit at the outlet end and has an abutting portion abutting a bottom of the switching unit and selectively driving the switching unit to block the main flow channel, a passing portion surrounding the abutting portion and having at least one through hole formed through the passing portion, and a hanging portion fixed with an outer side of the passing portion, movably held on the shoulder portion, and having an inner edge spaced from an outer surface of the housing and a space formed on a side of the hanging portion facing the passing portion.

Other objects, advantages and novel features of the invention will become more apparent from the following detailed description when taken in conjunction with the accompanying drawings.

DETAILED DESCRIPTION OF PREFERRED EMBODIMENT

Figure 1:
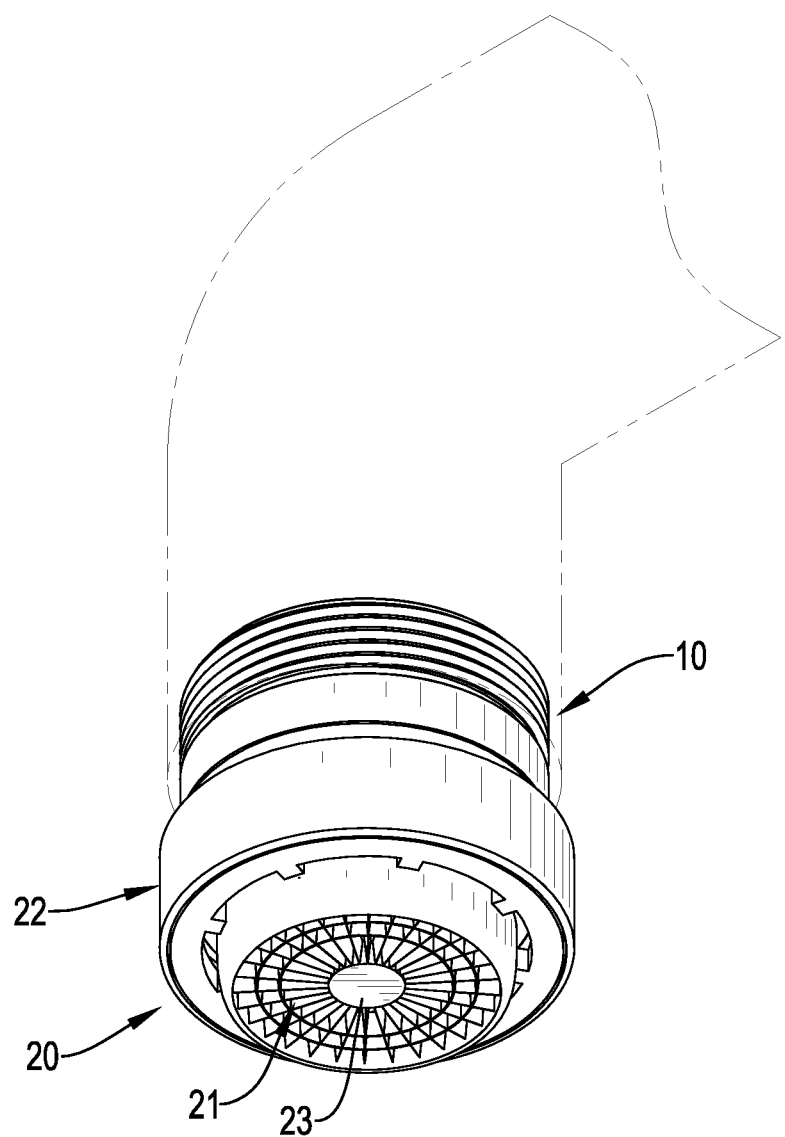
FIG. 1 is a perspective view of a multi-directional touch valve in accordance with the present invention mounted in a spout.

With reference to FIGS. 1 to 4, an embodiment of a multi-directional touch tap valve has a valve unit 10 and a press unit 20.

The valve unit 10 has a housing 11, a switching unit 12, and a main flow channel 13. The housing 11 has an outlet end 1101 and a connecting end 1102 opposite each other. The connecting end 1102 is connected with a spout of a faucet or an outlet of a water pipe. The water flows through the housing 11 from the connecting end 1102 to the outlet end 1101. An axial direction is defined through the outlet end 1101 and the connecting end 1102. A transversal direction is defined perpendicular to the axial direction. In the embodiment, an upward direction is defined from the outlet end 1101 to the connecting end 1102, and a downward direction is defined from the connecting end 1102 to the outlet end 1101. In other words, the connecting end 1102 is defined on the top of the housing 11 and the outlet end 1101 is defined on the bottom of the housing 11, but it is not limited thereto.

The switching unit 12 is mounted in the housing 11. The main flow channel 13 is formed in the housing 11 from the connecting end 1102 to the outlet end 1101 and extends through the switching unit 12.

Figure 2:
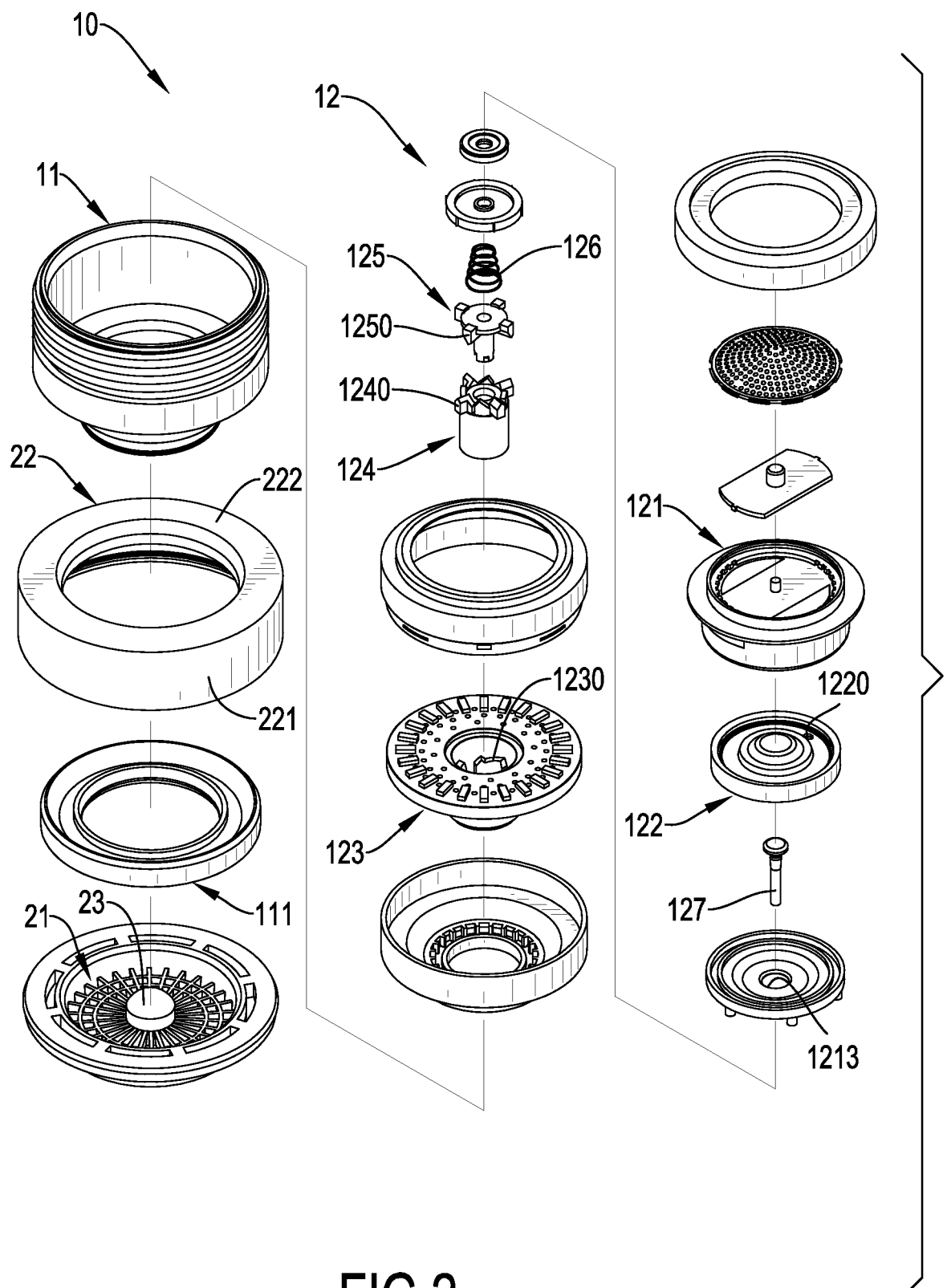
FIG. 2 is an exploded perspective view of the multi-directional touch valve in FIG. 1.
Figure 3:
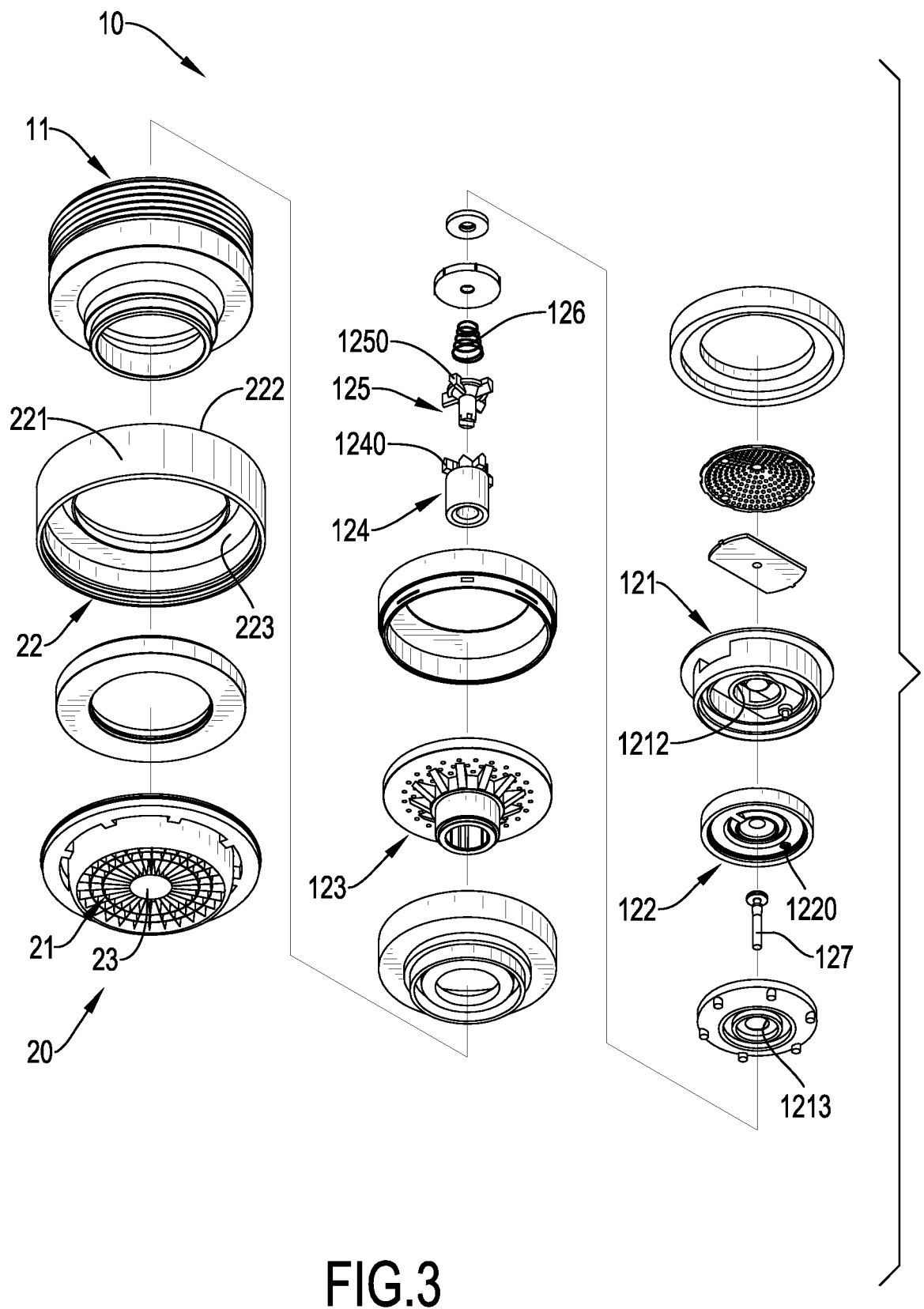
FIG. 3 is another exploded perspective view of the multi-directional touch valve in FIG. 1.
Figure 4:
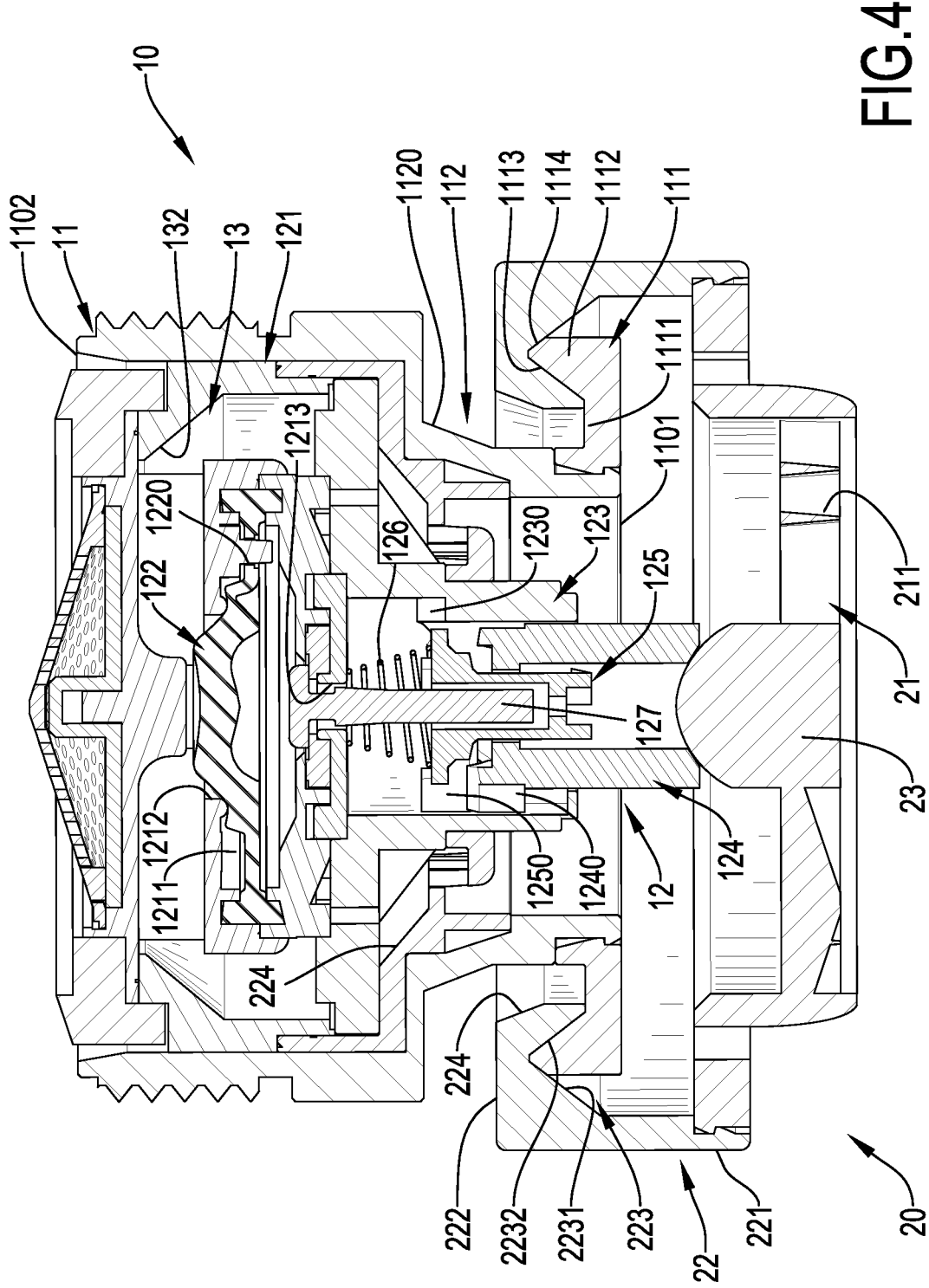
FIG. 4 is an enlarged cross sectional side view of the multi-directional touch valve in FIG. 1, showing a closed status of the multi-directional touch valve.
Figure 5:
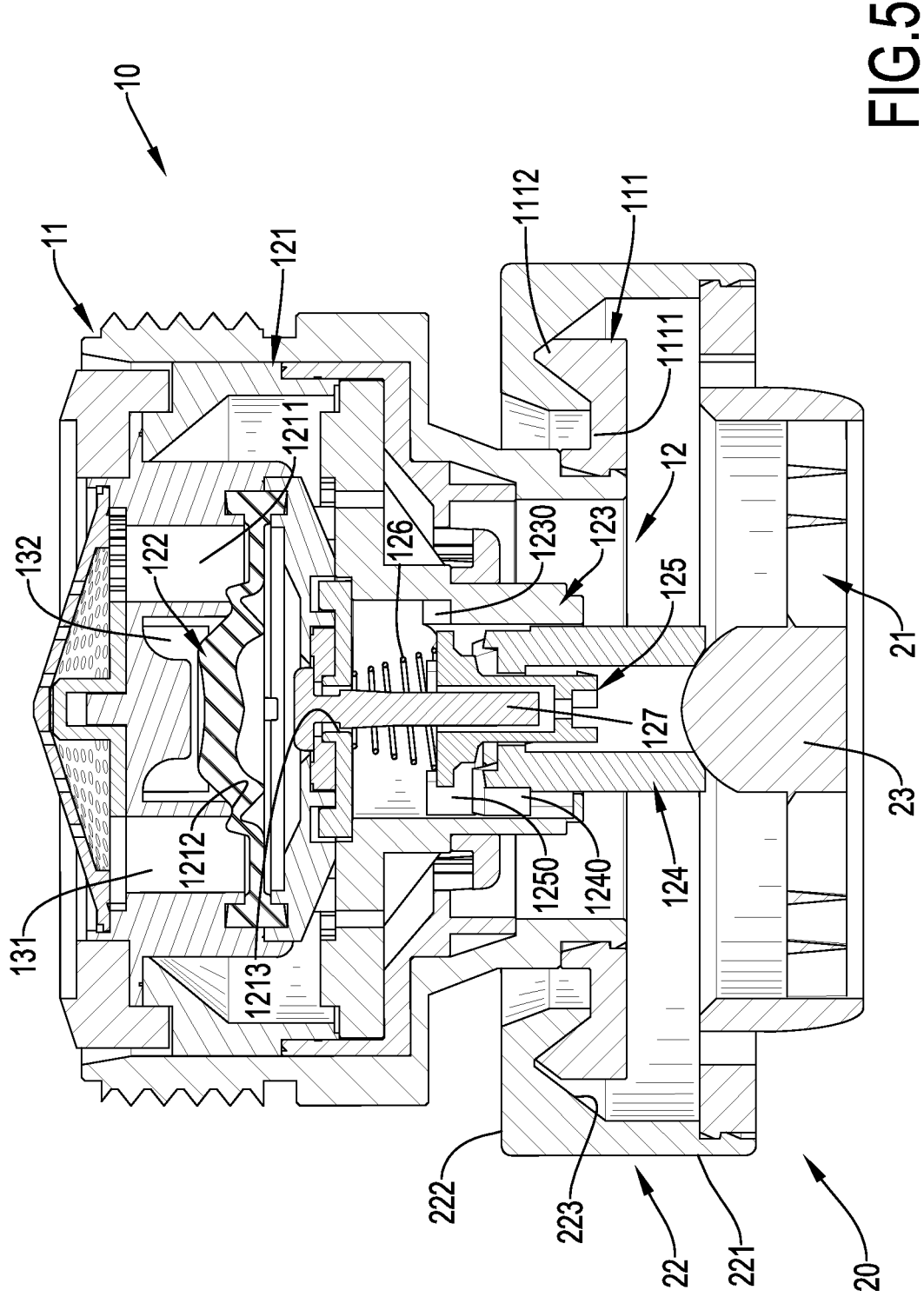
FIG. 5 is another enlarged cross sectional side view of the multi-directional touch valve in FIG. 1, showing the closed status of the multi-directional touch valve.

With reference to FIGS. 2, 4 and 5, the housing 11 has at least one shoulder portion 111. The at least one shoulder portion 111 is adjacent to the outlet end of the housing 11, is mounted on the outlet end 1101 of the housing 11, and protrudes transversally outward form the outer surface of the housing 11. The at least one shoulder portion 111 may have a first transversal portion 1111 and a first axial portion 1112. The first transversal portion 1111 protrudes from the outlet end 1101 of the housing 11 and extends transversally outward from the outlet end 1101. The first axial portion 1112 is formed on an outer edge of the first transversal portion 1111 and protrudes toward the connecting end 1102 of the housing 11 from the first transversal portion 1111. A cross section of the at least one shoulder portion 111 is L-shaped, but it is not limited thereto. In the embodiment, an amount of the at least one shoulder portion 111 is one. The shoulder portion 111 radially and outwardly protrudes from the housing 11. The first transversal portion 1111 and the first axial portion 1112 are annular. Preferably, the first axial portion 1112 of the shoulder portion 111 has two opposite inclined surfaces 1113, 1114 formed on an end of the first axial portion 1112 facing the connecting end 1102. The inclined surfaces 1113, 1114 are adjacent to and face away from each other. One of the inclined surfaces 1114 is located near the exterior, and the other inclined surface 1113 is located near the interior. The inclined surface 1114 located near the exterior faces outward and is oblique upward from the outer side of the first axial portion 1112. The inclined surface 1113 located near the interior faces inward and is oblique upward from the inner side of the first axial portion 1112. The cross section of the first axial portion 1112 is tapered in shape.

Preferably, the housing 11 has at least one groove 112 recessed in the outer surface of the housing 11. The surface of each of the at least one groove 112 near the outlet end 1101 is formed as one of the at least one shoulder portion 111. An amount of the at least one groove 112 is equal to the amount of the at least one shoulder portion 111. The groove 112 has a beveled surface 1120 formed on an inner edge of the groove 112 away from the shoulder portion 111 and is inclined relative to the axial direction. In another embodiment, the housing 11 may have no groove 112, and the shoulder portion 111 protrudes from the outer surface of the housing 11.

The press unit 20 is movably connected with the valve unit 10 at a position near the outlet end 1101 and has a passing portion 21, at least one hanging portion 22, and an abutting portion 23. The passing portion 21 is located below the shoulder portion 111, is spaced from the shoulder portion 111 of the housing 11, and has at least one through hole 211 axially formed therethrough for water to flow through. The water flowing from the main flow channel 13 flows out of the multi-directional touch valve via the passing portion 21. The passing portion 21 may have through holes 211 arranged in mesh patterns, radial patterns, grid patterns, and so on for water to flow through.

The at least one hanging portion 22 is fixed with the outer side of the passing portion 21, is movably held on the at least one shoulder portion 111, and has an inner edge spaced from an outer surface of the housing 11 and a space formed in a side of the at least one hanging portion 22 facing the passing portion 21. The hanging portion 22 has a second axial portion 221, a second transversal portion 222, and a positioning recess 223. The second axial portion 221 is fixed with the outer side of the passing portion 21 and protrudes from the passing portion 21 toward the connecting end 1102. The second transversal portion 222 is formed on an end of the second axial portion 221 facing the connecting end 1102, extends transversally inward from the end of the second axial portion 221, and is spaced from the outer surface of the housing 11. In other words, the cross section of the hanging portion 22 is inverted L-shaped. The second transversal portion 222 has a bevel 224 formed on an inner edge of the second transversal portion 222 facing the housing 11 and near the connecting end 1102. The bevel 224 is upwardly inclined from the inner edge of the second transversal portion 222. The bevel 224 is parallel to and is spaced form the beveled surface 1120 of the groove 112 of the housing 11.

The positioning recess 223 is recessed in a side of the second transversal portion 222 facing the outlet end 1101. Preferably, the positioning recess 223 has two opposite inclined surfaces 2231, 2232 facing the passing portion 21, but it is not limited thereto. The positioning recess 223 may be a concave surface recessed upwardly in the second transversal portion 222. One of the inclined surface 2231 is located near the exterior, and the other inclined surface 2232 is located near the interior. The inclined surface 2231 near the exterior faces inward and is inclined upwardly from the outer side of the positioning recess 223, and the inclined surface 2232 near the interior faces outwardly and is inclined upwardly from the inner side of the positioning recess 223.

The shoulder portion 111 is movably mounted in a space formed in the press unit 20 between the hanging portion 22 and the passing portion 21. The first axial portion 1112 of the shoulder portion 111 is movably mounted in the positioning recess 223. The hanging portion 22 selectively abuts the side of the shoulder portion 111 facing the connecting end 1102 of the housing 11. When no external force is applied to the press unit 20, the press unit 20 is under the force of the gravity, and the hanging portion 22 abuts the shoulder portion 111. Because of the two inclined surfaces 2231, 2232 of the positioning recess 223, the first axial portion 1112 is mounted into the deepest position of the positioning recess 223, where the two inclined surfaces 2231, 2232 are connected with each other. At this moment, the central axis of the press unit 20 is aligned with the central axis of the housing 11.

An amount of the at least one hanging portion 22 is equal to the amount of the at least one shoulder portion 111. In the embodiment, the amount of the at least one hanging portion 22 is one. The hanging portion 22 is annular and extends radially inward from the outer side of the press unit 20. The second axial portion 221, the second transversal portion 222, and the positioning recess 223 are annular.

The abutting portion 23 is fixed on the center of the passing portion 21. In other words, the passing portion 21 surrounds the abutting portion 23. The abutting portion 23 is adjacent to the switching unit 12 and selectively drives the switching unit 12 to block the main flow channel 13. The abutting portion 23 has a protrusion surface facing the connecting end 1102 of the housing 11. The abutting portion 23 protrudes toward the connecting end 1102 of the housing 11 from the passing portion 21. In another embodiment, the abutting portion 23 may have a recessed surface. While moving relative to the valve unit 10, the abutting portion 23 drives the switching unit 12 to block or unblock the main flow channel 13.

An active space is formed around the shoulder portion 111 and the hanging portion 22. The active space includes the space formed between the inner edge of the hanging portion 22 and the outer surface of the housing 11, the space formed in the press unit 20 below the hanging portion 22, and the space formed in the groove 112 of the housing 11. Thus, the press unit 20 may move relative to the valve unit 10 along a direction misaligned with the axis of the valve unit 10, the abutting portion 23 is capable of moving toward the connecting end of the housing along a direction misaligned with an axis of the valve unit 10. In other words, the hanging portion 22 may move in the groove 112 relative to the housing 11, and the shoulder portion 111 may move in the space formed in the press unit 20 relative to the press unit 20. Because of the active space formed between the press unit 20 and the housing 11, the press unit 20 may move along the axial direction, the transversal direction, or an oblique direction relative to the valve unit 10 without being blocked.

In another embodiment, there are multiple hanging portions 22 and multiple shoulder portions 111. Each of the hanging portions 22 is held on a respective one of the shoulder portions 111. The hanging portions 22 and the corresponding shoulder portions 111 are arranged along the axial direction. The first axial portion 1112 of each shoulder portion 111 is mounted in the positioning recess 223 of the respective one of the hanging portions 22. The width of the positioning recess 223 is larger than the width of the first axial portion 1112. Thus, the press unit 20 may not be blocked while being pressed transversally or obliquely.

In another embodiment, the shoulder portion 111 may have the first transversal portion 1111 without the first axial portion 1112. The hanging portion 22 may have the second transversal portion 222 without the second axial portion 221. The shoulder portion 111 and the hanging portion 22 may only extend transversally.

The switching unit 12 is mounted in the housing 11 and selectively blocks the main flow channel 13. In the embodiment, the switching unit 12 has a flow seat 121, a gasket 122, a controlling seat 123, a shifting element 124, a turning element 125, an elastic element 126, and a blocking element 127, but it is not limited thereto.

The flow seat 121 is fixed in the housing 11 and the main flow channel 13 is formed through the flow seat 121. The flow seat 121 has a chamber 1211, a first opening 1212, and a second opening 1213. The chamber 1211 is formed in the flow seat 121. The first opening 1212 is formed in the top of the flow seat 121 and communicates with the chamber 1211. The second opening 1213 is formed in the bottom of the flow seat 121 and communicates with the chamber 1211. The main flow channel 13 extends through the chamber 1211. In other words, the chamber 1211 is a segment of the main flow channel 13. The first opening 1212 and the second opening 1213 are respectively formed in opposite sides of the flow seat 121. The first opening 1212 faces the connecting end 1102. The second opening 1213 faces the outlet end 1101. The main flow channel 13 is divided to an input path 131 and an output path 132 at the first opening 1212.

The gasket 122 is movably mounted in the chamber 1211 to divide the chamber 1211 into a major compartment and a minor compartment. The major compartment is located near the outlet end 1101 and the minor compartment is located near the connecting end 1102. The input path 131 of the main flow channel 13 extends through the minor compartment. The gasket 122 selectively seals the first opening 1212 to block the input path 131 from communicating with the output path 132. The gasket 122 may seal the first opening 1212 by bending toward and protruding into the first opening 1212 to abut against the edge of the first opening 1212, or the gasket 122 may seal the first opening 1212 by moving upwardly to abut against the edges of the first opening 1212. The gasket 122 has a gasket hole 1220 formed therethrough and communicating with the second opening 1213. The gasket hole 1220 of the gasket 122, the minor compartment of the chamber 1211, and the second opening 1213 of the flow seat 121 form a minor flow channel.

The controlling seat 123 is mounted in the housing 11 and is disposed below the flow seat 121 near the outlet end 1101. The controlling seat 123 has a through cavity and multiple tooth portions 1230. The tooth portions 1230 are formed in the through cavity, protrude inwardly from the surface of the through cavity, and are arranged around the through cavity at angular intervals. A mounting recess is formed between each two tooth portions 1230 adjacent each other and extends axially. The shifting element 124 is mounted in the through cavity and has multiple guiding protrusions 1240 radially protruding therefrom. Each guiding protrusion 1240 is mounted in a respective one of the mounting recesses. The width of each guiding protrusion 1240 is equal to the width of each mounting recess. The sliding direction of the shifting element 124 is limited in the axial direction by the guiding protrusion 1240. The bottom of the shifting element 124 abuts against the press unit 20. The abutting portion 23 is disposed at the bottom of the shifting element 124 and abuts against the shifting element 124. The shifting element 124 has a recessed surface to receive the top of the abutting portion 23 being mounted therein.

The turning element 125 is mounted in the controlling seat 123 and is disposed at the top of the shifting element 124 facing the connecting end 1102 of the housing 11. The turning element 125 is rotatably and axially movably mounted in the controlling seat 123 and selectively abuts against the shifting element 124. The turning element 125 has multiple guided protrusions 1250 radially protruding from the turning element 125. The guided protrusions 1250 are selectively mounted in the mounting recesses, are stacked on the guiding protrusions 1240 and are selectively stacked on the tooth portions 1230 of the controlling seat 123. The guided protrusions 1250 of the turning element 125 mounted in the mounting recesses and stacked on the guiding protrusions 1240 of the shifting element 124 can be pressed and turned for an angle to be stacked on the tooth portions 1230. An end of the elastic element 126 abuts against the flow seat 121, and the other end of the elastic element 126 abuts against the turning element 125 to press the turning element 125 toward the outlet end 1101 of the housing 11. The blocking element 127 is axially movably mounted in the controlling seat 123 and is connected with the turning element 125. The blocking element 127 is driven by the turning element 125 to selectively block the second opening 1213.

With such arrangements, the multi-directional touch valve has a closed status, a transitional status, and an open status.

With reference to FIGS. 4 and 5, in the closed status, the hanging portion 22 of the press unit 20 abuts against the shoulder portion 111 of the valve unit 10. The surface of the positioning recess 223 abuts against the shoulder portion 111. In the embodiment, the surface of the positioning recess 223 abuts the first axial portion 1112 of the shoulder portion 111. The first axial portion 1112 of the shoulder portion 111 is mounted in the positioning recess 223. At the same time, the turning element 125 is stacked on the shifting element 124, and the guided protrusions 1250 of the turning element 125 are mounted in the mounting recesses and stacked on the guiding protrusions 1240 of the shifting element 124. Thus, the turning element 125 is disposed at a position away from the connecting end 1102 of the housing 11, and the blocking element 127 is away from the connecting end 1102 of the housing 11 to seal the second opening 1213 of the flow seat 121. When water flowing into the main flow channel 13, water firstly flows through the input path 131 to the major compartment of the chamber 1211. Because the gasket hole 1220 of the gasket 122 is not sealed, the water flows through the gasket hole 1220 to the minor compartment, but cannot flow through the second opening 1213. The water inside the minor compartment cannot flow out to form a water pressure to push the gasket 122 up to abut against the edge of the first opening 1212 to seal the first opening 1212. The main flow channel 13 is blocked.

Figure 6:
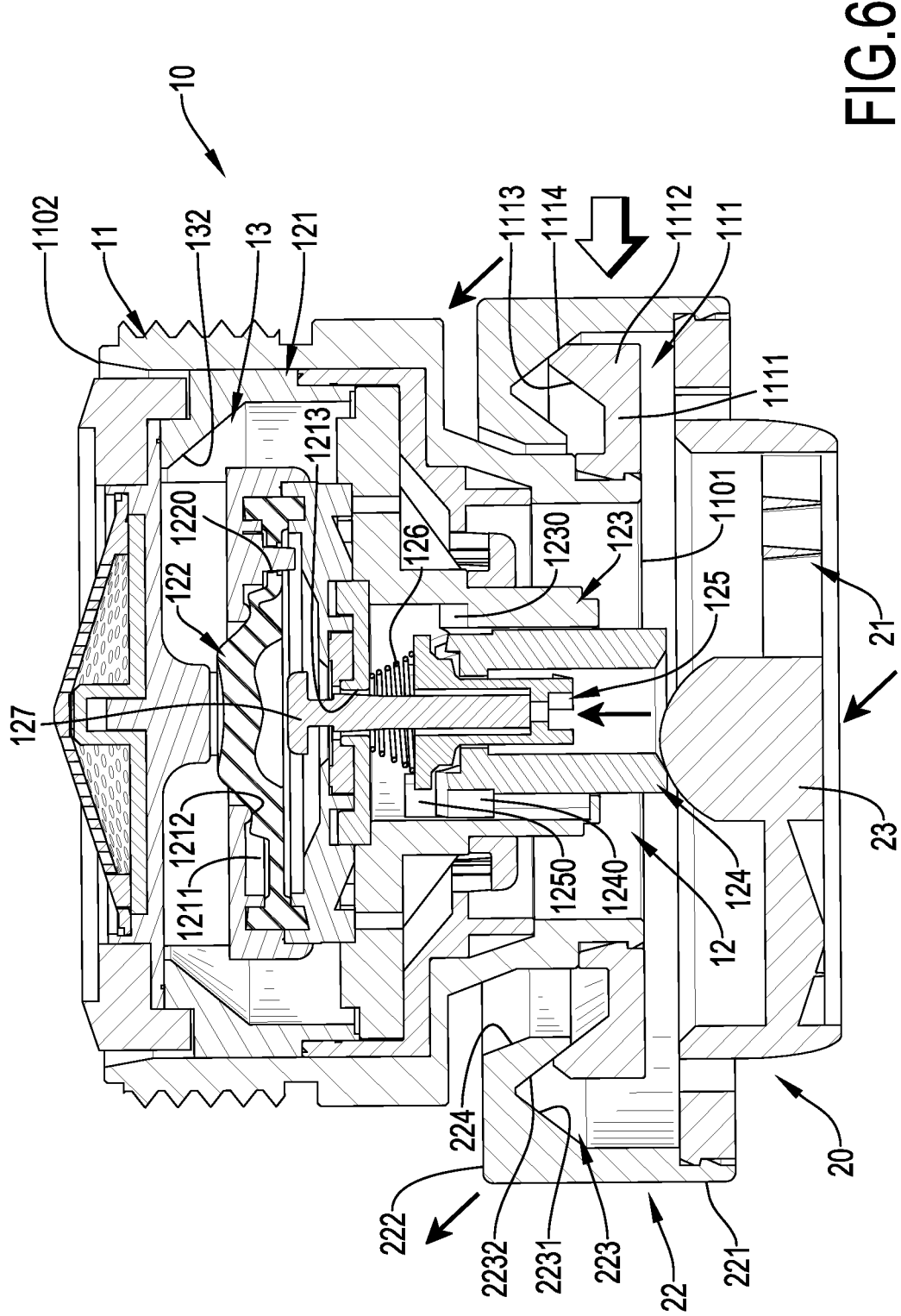
FIG. 6 is an operational cross sectional side view of the multi-directional touch valve in FIG. 4, showing a transitional status of the multi-directional touch valve subjected to a transversal pressing force.
Figure 7:
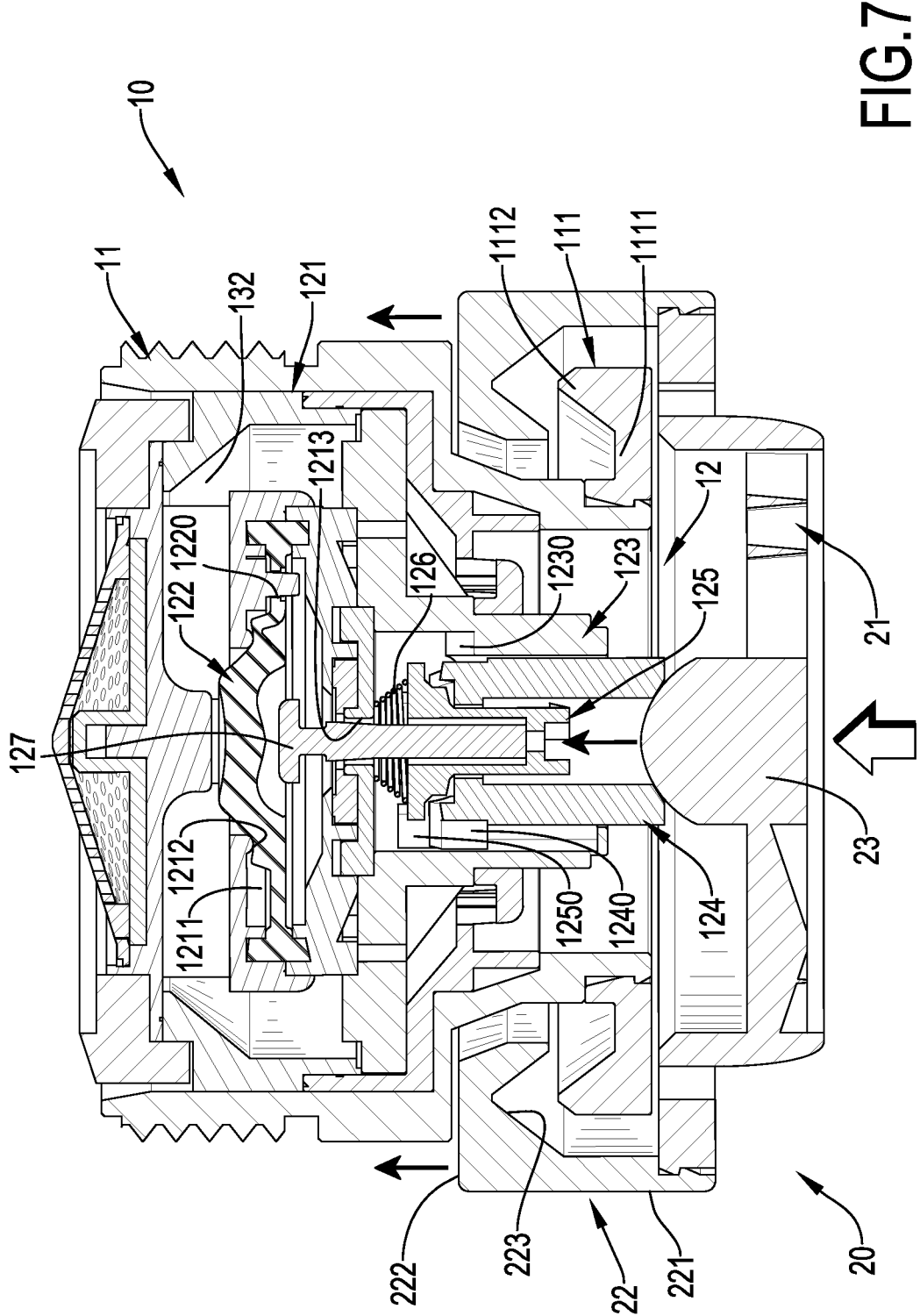
FIG. 7 is an operational cross sectional side view of the multi-directional touch valve in FIG. 4, showing a transitional status of the multi-directional touch valve subjected to axial pressing force.
Figure 8:
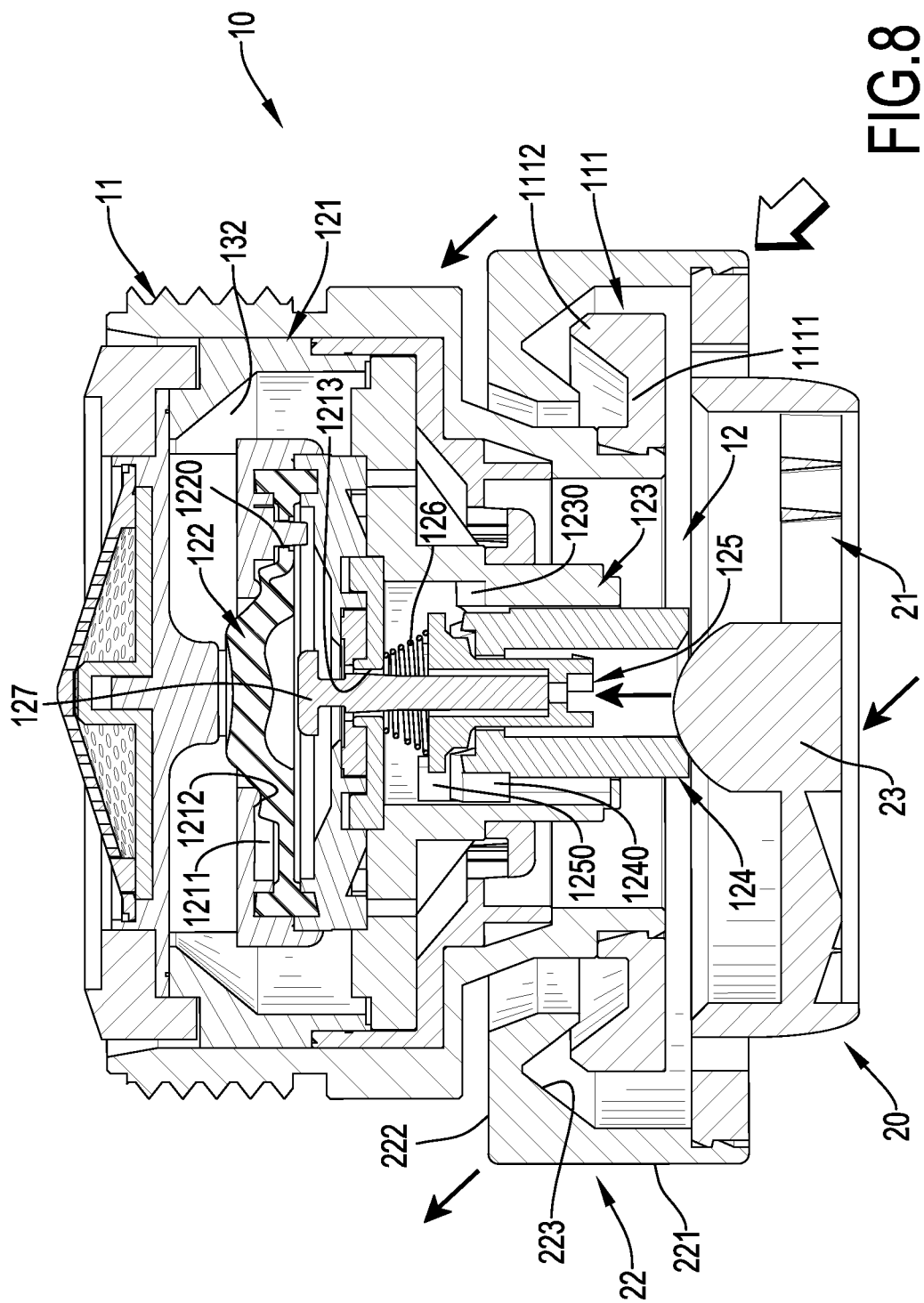
FIG. 8 is an operational cross sectional side view of the multi-directional touch valve in FIG. 4, showing a transitional status of the multi-directional touch valve subjected to an oblique pressing force.

With reference to FIGS. 6, 7, and 8, the press unit 20 can be pressed axially, transversally, or obliquely. Because of the space formed in the press unit 20 below the hanging portion 22, the press unit 20 can be axially moved upward. Because the inner edge of the hanging portion 22 is spaced from the outer side of the housing 11, the press unit 20 can be transversally moved relative to the valve unit 10 in any radial direction. Because of the active space formed between the press unit 20 and the housing 11, the hanging portion 22 can be obliquely moved relative to the housing 11, and the press unit 20 can be move obliquely.

The transitional status is defined during the movement of the press unit 20. In transitional status, the abutting portion 23 of the press unit 20 is shifted away from the preset position, and the abutting portion 23 abuts against the shifting element 124 to move up. When the shifting element 124 is moving up, the guiding protrusions 1240 of the shifting element 124 slide along the mounting recesses formed between the tooth portions 1230 of the controlling seat 123, and the shifting element 124 pushes the turning element 125 to move up and out from the mounting recesses. Because abutting surfaces between the guiding protrusions 1240 and the guided protrusions 1250 are inclined surfaces, the turning element 125 is driven to turn for an angle after the guided protrusions 1250 move out of the mounting recesses. The guided protrusions 1250 are turned to be stacked on the tooth portion 1230. When the pressing force is stopped, the elastic element 126 abuts against the shifting element 124 to press the shifting element 124 return to the preset position and drives the abutting portion 23 to return to the preset position.

For example, with reference to FIG. 6, because of the inclined surfaces 1113, 1114 of the first axial portion 1112 of the shoulder portion 111 or the inclined surfaces 2231, 2232 of the positioning recess 223 of the hanging portion 22, the hanging portion 22 can slide along the inclined surfaces while being transversally pressed. The press unit 20 has an axial movement while being transversally pressed. Thus, the movement of the abutting portion 23 pressing the shifting element 124 moving upward is ensured.

Figure 9:
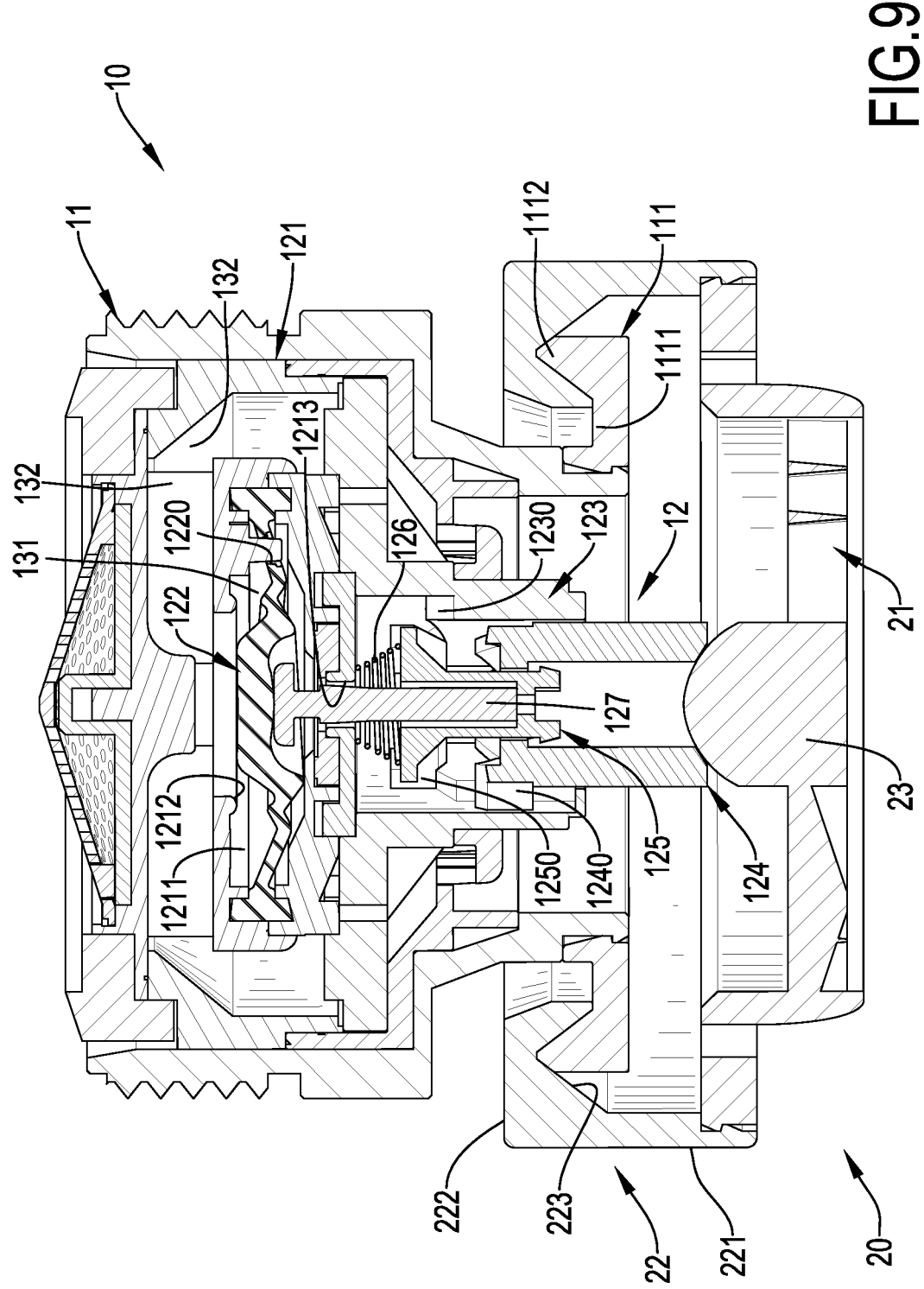
FIG. 9 is an enlarged cross sectional side view of the multi-directional touch valve in FIG. 1, showing an open status of the multi-directional touch valve.
Figure 10:
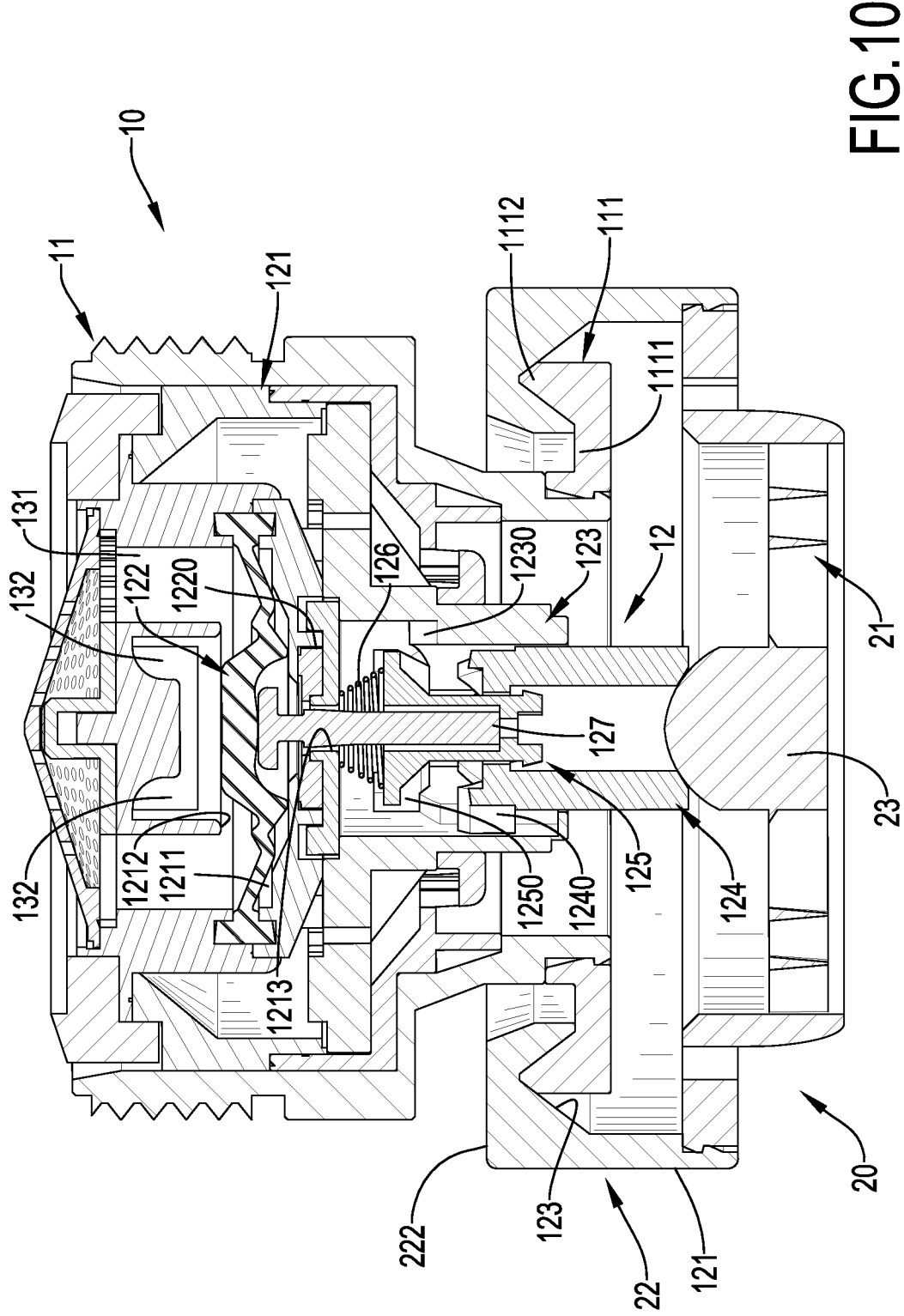
FIG. 10 is another enlarged cross sectional side view of the multi-directional touch valve in FIG. 1, showing an open status of the multi-directional touch valve.

With reference to FIGS. 9 and 10, while moving upward, the turning element 125 drives the blocking element 127 to move away from the second opening 1213 for unsealing the second opening 1213. The open status is defined at the moment when the blocking element 127 is unsealing the second opening 1213. The water filled in the minor compartment can flow out from the second opening 1213. The water pressure inside the minor compartment is released, and the gasket 122 can move downwardly or deform downwardly to unseal the first opening 1212. The input path 131 can communicate with the output path 132 via the first opening 1212. The water can flow to the output path 132 to supply water.

When the press unit 20 is pressed in any of axial, transversal, or oblique direction, the turning element 125 is turned again, and the guided protrusions 1250 of the turning element 125 are driven into the mounting recesses formed between the tooth portions 1230 of the controlling seat 123, and the turning element 125 moves away from the connecting end 1102. At the moment, the blocking element 127 can move down to seal the second opening 1213. The water cannot flow out from the second opening 1213 to form the water pressure to push the gasket 122 to seal the first opening 1212, and the multi-directional touch valve is closed.

The press unit 20 can be pressed from any of axial direction, transversal directions, and oblique directions to drive the switching unit 12 to switch the valve unit 10. The convenience of the multi-directional touch valve is enhanced.

What is claimed is:

1. A multi-directional touch valve comprising:
   a valve unit having
      a housing having
         an outlet end;
         a connecting end opposite the outlet end;
         a shoulder portion being adjacent to the outlet end of the housing and protruding transversally outward from the housing;
      a main flow channel formed in the housing from the connecting end to the outlet end of the housing; and
      a switching unit mounted in the housing and selectively blocking the main flow channel; and
   a press unit movably connected with the valve unit at the outlet end and having
      an abutting portion abutting the switching unit and selectively driving the switching unit to block the main flow channel;
      a passing portion surrounding the abutting portion and having at least one through hole formed through the passing portion; and
      a hanging portion fixed with an outer side of the passing portion, movably held on the shoulder portion, and having an inner edge spaced from an outer surface of the housing and a space formed on a side of the hanging portion facing the passing portion,
   wherein
   the shoulder portion has
      a first transversal portion protruding from the outlet end of the housing and extending transversally outward from the outlet end; and
      a first axial portion formed on an outer edge of the first transversal portion and protruding toward the connecting end of the housing from the first transversal portion;
   the hanging portion has
      a second axial portion protruding toward the connecting end of the housing from the outer edge of the passing portion;
      a second transversal portion formed on an end of the second axial portion, protruding transversally inward from the second axial portion, and spaced from the outer surface of the housing; and
      a positioning recess recessed in a side of the second transversal portion facing the passing portion; and
   the first axial portion of the shoulder portion is movably mounted in the positioning recess of the hanging portion.

2. The multi-directional touch valve as claimed in claim 1, wherein the positioning recess of the hanging portion has two opposite inclined surfaces facing each other.

3. The multi-directional touch valve as claimed in claim 2, wherein the first axial portion of the shoulder portion has two opposite inclined surfaces facing away from each other and selectively abutting the inclined surfaces of the positioning recess.

4. The multi-directional touch valve as claimed in claim 1, wherein the second transversal portion of the hanging portion has a bevel formed in an inner edge of the second transversal portion facing the connecting end.

5. The multi-directional touch valve as claimed in claim 4, wherein
   the housing has a groove recessed in the outer surface of the housing, and the shoulder portion is formed on a surface of the groove facing the connecting end of the housing;
   the hanging portion of the press unit is movably mounted in the groove of the housing; and the groove has a beveled surface formed in an inner edge of the groove away from the outlet end of the housing and being parallel to the bevel of the hanging portion.

6. The multi-directional touch valve as claimed in claim 1, wherein
the first transversal portion and the first axial portion of the shoulder portion are annular;
the second axial portion, the second transversal portion, and the positioning recess of the hanging portion are annular.

7. The multi-directional touch valve as claimed in claim 2, wherein
the first transversal portion and the first axial portion of the shoulder portion are annular;
the second axial portion, the second transversal portion, and the positioning recess of the hanging portion are annular.

8. The multi-directional touch valve as claimed in claim 3, wherein
the first transversal portion and the first axial portion of the shoulder portion are annular;
the second axial portion, the second transversal portion, and the positioning recess of the hanging portion are annular.

9. The multi-directional touch valve as claimed in claim 4, wherein
the first transversal portion and the first axial portion of the shoulder portion are annular;
the second axial portion, the second transversal portion, and the positioning recess of the hanging portion are annular.

10. The multi-directional touch valve as claimed in claim 5, wherein
the first transversal portion and the first axial portion of the shoulder portion are annular;
the second axial portion, the second transversal portion, and the positioning recess of the hanging portion are annular.

11. The multi-directional touch valve as claimed in claim 1, wherein
a width of the positioning recess of the at least one hanging portion is larger than a width of the first axial portion.

12. The multi-directional touch valve as claimed in claim 2, wherein
a width of the positioning recess of the at least one hanging portion is larger than a width of the first axial portion.

13. The multi-directional touch valve as claimed in claim 3, wherein
a width of the positioning recess of the at least one hanging portion is larger than a width of the first axial portion.

14. The multi-directional touch valve as claimed in claim 4, wherein
a width of the positioning recess of the at least one hanging portion is larger than a width of the first axial portion.

15. The multi-directional touch valve as claimed in claim 5, wherein
a width of the positioning recess of the at least one hanging portion is larger than a width of the first axial portion.

\* \* \* \* \*